(12) United States Patent
Zanetto et al.

(10) Patent No.: US 8,137,475 B2
(45) Date of Patent: Mar. 20, 2012

(54) ANTI-GRAFFITI TREATMENT

(75) Inventors: Jean-Emille Zanetto, Paris (FR);
Valérie Legros, Villeparisis (FR);
Valérie Billebaud, Asnieres-sur-seine (FR); Sylvie Touzet, Antony (FR)

(73) Assignee: Rhodia Operations, Aubervilliers Cedex (FR)

( * ) Notice: Subject to any disclaimer, the term of this patent is extended or adjusted under 35 U.S.C. 154(b) by 0 days.

(21) Appl. No.: 12/599,256

(22) PCT Filed: Apr. 25, 2008

(86) PCT No.: PCT/EP2008/055050
§ 371 (c)(1),
(2), (4) Date: Jul. 16, 2010

(87) PCT Pub. No.: WO2008/135409
PCT Pub. Date: Nov. 13, 2008

(65) Prior Publication Data
US 2010/0279911 A1    Nov. 4, 2010

(30) Foreign Application Priority Data
May 7, 2007  (FR) ..................... 07 03282

(51) Int. Cl.
*C11D 7/50* (2006.01)

(52) U.S. Cl. .......... 134/38; 510/201; 510/202; 510/211; 510/212

(58) Field of Classification Search .................. 134/38; 510/201, 202, 211, 212
See application file for complete search history.

(56) References Cited

U.S. PATENT DOCUMENTS

| | | | |
|---|---|---|---|
| 4,429,147 A | 1/1984 | Agnès et al. | |
| 5,030,290 A * | 7/1991 | Davis | 134/4 |
| 5,565,136 A | 10/1996 | Walsh | |
| 6,262,259 B1 | 7/2001 | Cotting et al. | |
| 6,358,901 B1 | 3/2002 | Joye et al. | |
| 7,468,345 B2 * | 12/2008 | Decker | 510/201 |
| 2002/0013241 A1 * | 1/2002 | Lallier et al. | 510/201 |
| 2002/0032138 A1 * | 3/2002 | Lallier | 510/201 |
| 2006/0229220 A1 * | 10/2006 | Hawes et al. | 510/201 |
| 2006/0234890 A1 * | 10/2006 | Griese et al. | 510/214 |
| 2006/0252663 A1 * | 11/2006 | Hawes et al. | 510/201 |
| 2007/0082834 A1 * | 4/2007 | Hudson | 510/407 |
| 2007/0087952 A1 * | 4/2007 | Hei et al. | 510/214 |
| 2007/0267464 A1 * | 11/2007 | Vitcak et al. | 228/203 |
| 2008/0081778 A1 * | 4/2008 | Decker | 510/505 |
| 2008/0139437 A1 * | 6/2008 | Power | 510/208 |
| 2009/0093390 A1 * | 4/2009 | Gross et al. | 510/174 |
| 2009/0224204 A1 * | 9/2009 | Marion et al. | 252/364 |
| 2009/0281012 A1 * | 11/2009 | Trivedi et al. | 510/138 |
| 2010/0035784 A1 * | 2/2010 | Lallier et al. | 510/174 |
| 2010/0137183 A1 * | 6/2010 | Touzet et al. | 510/201 |
| 2010/0240564 A1 * | 9/2010 | Zanetto et al. | 510/202 |
| 2010/0273695 A1 * | 10/2010 | Sehgal et al. | 510/174 |
| 2010/0279911 A1 * | 11/2010 | Zanetto et al. | 510/201 |
| 2010/0292121 A1 * | 11/2010 | Jacquot et al. | 510/245 |
| 2011/0021398 A1 * | 1/2011 | Allef et al. | 510/138 |

FOREIGN PATENT DOCUMENTS

| | | |
|---|---|---|
| EP | 0765857 | 4/1997 |
| GB | 2377710 | 1/2003 |
| WO | WO 2005113244 | 1/2005 |

\* cited by examiner

*Primary Examiner* — Gregory Webb
(74) *Attorney, Agent, or Firm* — Hunton & Williams LLP

(57) ABSTRACT

The invention relates to the use, in anti-graffiti treatments, and preferably in graffiti-suppressing treatments, of a particular dicarboxylic acid diester having improved treatment efficiency.

13 Claims, 1 Drawing Sheet

ANTI-GRAFFITI TREATMENT

CROSS-REFERENCE TO RELATED APPLICATIONS

This application is the U.S. National Phase of International Application Number PCT/EP2008/055050 filed on Apr. 25, 2008, which claims priority to French Application No. FR 0703282, filed May 7, 2007.

FIELD OF THE INVENTION

A subject matter of the present invention is the use, in anti-graffiti treatments, preferably in treatments for the removal of graffiti, of a specific diester of a dicarboxylic acid which provides an improved effectiveness of treatment.

BACKGROUND

Various treatments are used to eliminate graffiti: there exist pretreatments carried out before the appearance of the graffiti, targeted at facilitating the removal of the graffiti after they have appeared, and treatments for the removal of graffiti employed after the appearance of the graffiti. Treatments for the removal of graffiti are generally carried out by cleaning with a liquid composition comprising a solvent.

The use is known in particular, for the pretreatments, of polymers of fluorinated latex type. A product comprising such polymers, intended to be applied to building materials, is sold in particular under the name Protectguard®. The use of other products is also known. Solvents are sometimes used as additives in the pretreatments.

The use is known in particular, for the treatments for the removal of graffiti, of a solvent of linear dicarboxylic acid diester type, in particular a solvent comprising a mixture of dimethyl adipate, dimethyl glutarate and dimethyl succinate, for example sold by Rhodia under the name Rhodiasolv® RPDE. This solvent is effective on a large number of surfaces but there exists a need for more effective solvents.

SUMMARY OF THE INVENTION

The present invention meets this need by providing for the use, in anti-graffiti treatments, of a product comprising a diester of a dicarboxylic acid of formula (I):

$$R^1\text{—OOC-A-COO—}R^2 \quad (I)$$

where
- the $R^1$ and $R^2$ groups, which are identical or different, represent a linear or branched, cyclic or noncyclic, $C_1$-$C_{20}$ alkyl, aryl, alkylaryl or arylalkyl group,
- the A group represents a divalent alkylene group, characterized in that the product comprises at least one diester of a dicarboxylic acid where the A group is a branched divalent $C_3$-$C_{10}$ alkylene group.

The dicarboxylic acid diester of the invention provides the treatment with an improved effectiveness. The effectiveness can be described by the traces of graffiti remaining after a removal operation. The improvement can be in particular have one of the following natures:
- fewer traces, for an identical removal operation, and/or
- as many or fewer traces, for a removal operation with a reduced effort, and/or
- as many or fewer traces, for a removal operation of shorter duration, and/or
- fewer traces, with regard to other natures of substrates bearing, graffiti, in particular with regard to porous substrates, and/or
- as many or fewer traces, with regard to a greater number of natures of substrates bearing graffiti, (treatment of high modularity with respect to the substrate), and/or
- as many or fewer traces, with regard to a greater number of natures of inks or paints constituting the graffiti (treatment of high modularity with respect to the piece of graffiti).

The invention also relates to methods for anti-graffiti treatments comprising a stage in which a product comprising the diester of the invention is applied. The invention also relates to a composition for anti-graffiti treatments comprising the product comprising the diester of the invention.

BRIEF DESCRIPTON OF THE DRAWINGS

The drawings provide exemplary illustrations of the grades discussed in the Examples.

DETAILED DESCRIPTION OF PREFERRED EMBODIMENTS

Figure 1:
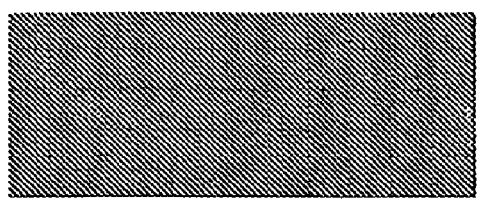
FIG. 1 illustrates Grade 0 wherein the surface is not cleaned.

Product Comprising the Diester of a Dicarboxylic Acid

The treatment uses a product comprising a specific diester of a dicarboxylic acid of formula (I), the A group of which is branched. In the present patent application, this diester of a dicarboxylic acid can be denoted by "specific diester", "diester of the invention" or "branched diester".

The product comprises at least one branched diester. It can comprise two or more thereof. In the patent application, unless the presence of at least two branched diesters is explicitly mentioned, "a" branched diester can denote a single branched diester corresponding to the formula (I) or a mixture or a combination of several branched diesters corresponding to the formula (I).

The product can comprise compounds other than the diester of the invention. It can in particular comprise additives, or by-products of an esterification reaction, and/or products resulting from by-products of a previous reaction. Reference may be made to a composition comprising the diester of the invention. Preferably, the product comprises at least 50% by weight, preferably at least 60%, preferably at least 70%, preferably at least 80%, preferably at least 90%, of the diester of the invention, with respect to the total amount of the product, preferably with respect to the total amount of compounds of the diesters of dicarboxylic acids type present in the product.

The A group is a branched divalent alkylene group. The corresponding acid is the compound of formula HOOC-A-COOH. By misuse of language, the A group can be denoted by the acid to which it corresponds.

In the diester of the invention, the A group can in particular by a $C_4$, $C_5$, $C_6$, $C_7$, $C_8$ or $C_9$ group or a mixture. It is preferably a $C_6$ group. The A group is preferably chosen from the following groups:

the $A_{MG}$ group of formula —CH(CH$_3$)—CH$_2$—CH$_2$— (corresponding to 2-methylglutaric acid), the $A_{ES}$ group of formula —CH(C$_2$H$_5$)—CH$_2$— corresponding to 2-ethylsuccinic acid), and their mixtures.

The $R^1$ and $R^2$ groups, which are identical or different, can be chosen in particular from the methyl, ethyl, n-propyl, isopropyl, benzyl, phenyl, n-butyl, isobutyl, cyclohexyl, hexyl, n-hexyl, isooctyl or 2-ethylhexyl groups. They correspond to the alcohols of formulae $R^1$—OH and $R^2$—OH, which are identical or different.

The product can advantageously comprise dimethyl 2-methylglutarate, of following formula:

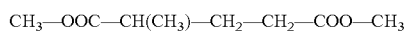

CH$_3$—OOC—CH(CH$_3$)—CH$_2$—CH$_2$—COO—CH$_3$

According to a specific embodiment, the product is a composition comprising the diesters of dicarboxylic acids of following formulae (I'), (I'') and optionally (II):

$R^1$—OOC-$A_{MG}$-COO—$R^2$ (I'),

$R^1$—OOC-$A_{ES}$-COO—$R^2$ (I''), optionally $R^1$—OOC—(CH$_2$)$_4$—COO—$R^2$ (II) (diester of adipic acid), where:

$A_{MG}$ is a group of formula —CH(CH$_3$)—CH$_2$—CH$_2$—,
$A_{ES}$ is a group of formula —CH(C$_2$H$_5$)—CH$_2$—.

In these formulae (I'), (I'') and (II), the $R^1$ and $R^2$ groups can in particular be methyl, ethyl or isobutyl groups.

A preferred composition comprises:

from 70 to 95% by weight of the dicarboxylic acid diester of formula (I'), preferably of the dimethyl ester, from 5 to 30% by weight of the dicarboxylic acid diester of formula (I''), preferably of the dimethyl ester, and from 0 to 10% by weight of the dicarboxylic acid diester of formula (II), preferably of the dimethyl ester.

The diester of the invention can be obtained by any known process resulting in diesters, in particular by reaction of an alcohol corresponding to the $R^1$ and $R^2$ groups with a dicarboxylic acid corresponding to the A group or a di(acyl chloride) of formula ClOC-A-COCl or a corresponding dinitrile of formula NC-A-CN. In the case where the product comprises several diesters of dicarboxylic acids, for example the diesters of formulae (I'), (I'') and optionally (II), the same type of reaction can be carried out starting from a corresponding mixture of dicarboxylic acids or of acyl chloride or of dinitriles.

The compositions comprising the diester(s) can be obtained in particular from a mixture of dinitrile compounds in particular produced and recovered in the process for the manufacture of adiponitrile by double hydrocyanation of butadiene. This process, used on a large scale industrially to produce the great majority of adiponitrile consumed worldwide, is described in numerous patents and works. The reaction for the hydrocyanation of butadiene results predominantly in the formation of linear dinitriles but also in the formation of branched dinitriles, the two main ones of which are methylglutaronitrile and ethylsuccinonitrile. The branched dinitrile compounds are separated by distillation in the stages for the separation and purification of the adiponitrile and are recovered, for example, as top fraction in a distillation column.

Typically, the mixture of branched dinitrile compounds is converted to diesters in order to thus obtain a novel solvent.

One of the possible processes for the conversion of the dinitrile compounds to diesters corresponds to the use of the Pinner reaction, described in particular in French patent No. 1 488 857. Basically, this process consists in reacting the dinitrile compounds with an alcohol in the presence of a strong inorganic acid, such as sulfuric acid, and in then hydrolyzing the products obtained in order to recover the diesters by distillation. This document also describes a specific embodiment of the process which consists in passing the mixture of dinitrile compounds and the alcohol into a bath of molten salts based on various alkali metal and ammonium sulfates, in order to avoid the formation of ammonium sulfate, and recovering the ammonia by steam extraction.

The diesters of the invention can also be obtained by a reaction between the dinitrile compounds, water and an alcohol in the gas phase and in the presence of a solid catalyst. The reaction temperature is advantageously greater than the condensation temperature of the diesters formed. Use may be made, as catalyst, of a solid acid catalyst, such as, for example, a silica gel, a silica/alumina mixture or supported boric or phosphoric acids. Use may also, be made of macroporous aluminas, such as those described in European patent EP 0 805 801. The temperature of the reaction is between 200 and 450° C., preferably between 230 and 350° C. The reaction can be carried out under any pressure, advantageously a pressure of between 0.1 and 20 bar. The vapors are rapidly cooled at the reactor outlet to a temperature of less than or equal to 150° C. The ammonia and then the water and the excess alcohol are separated by distillation from the mixture obtained.

The diesters of the invention can also be obtained by the reaction between the dinitrile compounds and an inorganic base, in order to obtain salts of acids, then neutralization of these salts by an acid followed by an esterification with an alcohol.

Finally, the diesters can be purified according to the purification processes conventionally used in the technical field for the preparation of organic compounds and in particular by distillation in one or more columns.

Anti-Graffiti Treatment

The anti-graffiti treatment is preferably a treatment for removal of graffiti present on a substrate. However, the use of the diester of the invention in a pretreatment, promoting the subsequent removal of the graffiti, is not ruled out. It should be noted that the graffiti can be completely or partially removed.

The graffiti can in particular be ink-based graffiti, for example, produced using a pen, or paint-based graffiti, for example produced using an aerosol can, a brush or a roller.

The substrate can in particular be a building material. In the present patent application, building material is understood to mean any large-sized element which can be found in the public sphere (interiors of buildings accessible to a large number of people, including businesses, restaurants, exterior parts of buildings accessible to third parties, means of transport, floors, street furniture, and the like), in contrast to the private, sphere (parts of apartments or houses not accessible to third parties).

The substrate, preferably a building material, can, for example, be made of one of the following materials:

a ceramic, preferably tiling, for example of enameled stoneware type, a hydraulic binder material, preferably made of cement, a mortar or a concrete, wood, baked clay, for example bricks, roof tiles or red hexagonal floor tiles, or stone, preferably porous stone.

The substrates can in particular be exterior surfaces of the following types, facades, freestone, railings, cornices, statues, joints, lintels and reveals of openings, facings, bases, balconies, terraces, stairway steps, footways and footpaths, fences, window boxes, parking areas, passages suitable for motor vehicles, garage floors, swimming pool curbstones, fountain surroundings, barbecues, roofs or chimneys.

The substrates can be interior surfaces of the following types; floors, chimney stones, work surfaces, tiling joints, and the like.

The substrate can in particular be a porous material, such as limestone, marble, sandstone, granite, slate, baked clay (roof tiles, bricks or red hexagonal floor tiles), concrete, coatings (mortar, plaster and lime), reconstituted stone or asphalt.

The invention proves to be particularly advantageous for substrates made of a porous material, such as, for example, limestone, marble, sandstone, granite, slate, baked clay (roof tiles, bricks or red hexagonal floor tiles), concrete, coatings (mortar, plaster and lime), reconstituted stone or asphalt.

A useful method of anti-graffiti treatment can in particular comprise the following stages:

optionally a stage of application of a pretreatment product, and after the appearance of a piece of graffiti, a stage of removal of the piece of graffiti using a removal composition comprising the product comprising the diester of the invention.

Use may be made, for the optional pretreatment, of a liquid treatment product comprising a pretreatment agent, for example a fluorinated latex. The product can be applied by any appropriate means, for example by dipping, spraying or applying with a brush or a roller. Use can in particular be made of means, employed in the field of painting and/or cleaning, for example paint guns or pressurized sprayers.

The pretreatment can be applied once or can be applied several times, at a chosen interval of time (for example once annually).

The removal of the piece of graffiti can be carried out with a removal composition comprising the product comprising the diester of the invention, preferably in the liquid form. The removal composition can be the product comprising the substantially pure diester of the invention. According to an alternative, it comprises the product and other compounds. The product can, for example, be diluted in water and/or in at least one other organic solvent. The composition can comprise additives, for example abrasive agents.

The removal composition can be applied to the piece of graffiti using any appropriate means, for example by spraying or applying with a brush or a roller, a sponge or a piece of cloth. The piece of graffiti can be rubbed, after or during the application, in order to remove it. However, the spraying force may be sufficient for the at least partial disappearance of the piece of graffiti. The removal operation can be repeated, if this is of use. Afterwards, the substrate can optionally be rinsed or washed, for example in order to eliminate the resulting solution and/or to eliminate possible marks of runoff.

Other details or advantages of the invention may become apparent in the light of the examples which follow, without a limiting nature.

EXAMPLES

Example 1

Preparation of a Composition Comprising the Diester of the Invention 43.26 g of a mixture A of dinitrile compounds are charged with 76.90 g of methanol in a glass reactor with a capacity of 500 ml equipped with a vertical reflux condenser and stirrer and heated with an oil bath.

The mixture A of dinitrile compounds is composed of:
86.9% by weight of methylglutaronitrile
11.2% by weight of ethylsuccinonitrile
1.9% by weight of adiponitrile.

The remainder to 100% corresponds to the impurities present in this mixture, which are generally not dinitrile compounds.

The dinitrile compounds/methanol mixture is cooled to approximately 1° C. before the addition of 84.22 g of 98% by weight sulfuric acid.

The reaction medium is heated to reflux and maintained at this temperature for 3 h. The reaction mass is heterogeneous and fluid. After cooling to 60° C., 63 g of water are added. The reaction medium is maintained at 65° C. for 2 hours.

117 g of additional water are then added. The reaction medium becomes a two-phase medium. After elimination of the excess methanol by evaporation, the two phases are separated by settling and analyzed. The organic phase recovered is washed with a saturated aqueous sodium chloride solution with addition of aqueous ammonia in order to obtain a pH in the vicinity of 7.

A second washing operation is carried out with a saturated aqueous sodium chloride solution.

After distillation of the washed organic phase, a mixture with the following composition is obtained:

| | |
|---|---|
| dimethyl 2-methylglutarate | 89% |
| dimethyl 2-ethylsuccinate | 9% |
| dimethyl adipate | 1% |
| various compounds | 1% |

Example 2

Treatments

Pretreatment:
  Protectguard®, sold by Guard Indsutrie, distributed in the Point P stores
  Novipro®, sold by product by a company which can be contacted on (33) 825 077 07 7
Substrate:
  Exterior tiling slab with a porous face, 36×36, distributed in the Point P stores under the reference 142 1408.
Paint Stimulating a Piece of Graffiti:
  Fluorescent orange aerosol paint, "Orange Fluo TP", sold by Soppec and distributed in the Point P stores.
Removal Composition:
A: Rhodiasolv® RPDE
B: Product of example 1
Tests
  Tests are carried out in which a treatment is applied ("impregnation"), a paint stimulating a piece of graffiti is applied ("application"), the paint is aged under different conditions ("aging"), the paint is eliminated ("deinking") and then the amount of paint eliminated is evaluated visually (a grade is assigned). Details with regard to the various operations are provided below.

Application

The paint is applied with a can, with three passes.

Deinking 2 ml of elimination composition are deposited for 5 min on the slabs positioned horizontally and then cleaning is carried out with absorbent paper.

Grading

Figure 2:
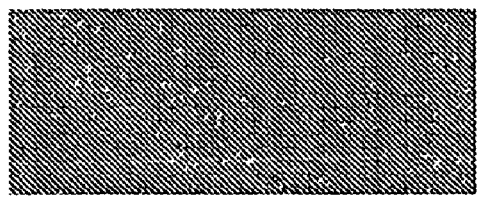
FIG. 2 illustrates Grade 1 wherein 20% of the surface is cleaned.
Figure 3:
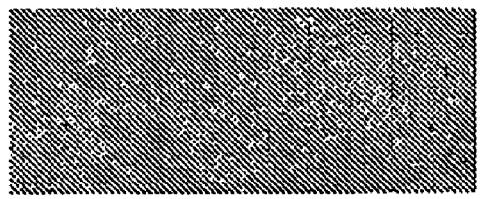
FIG. 3 illustrates Grade 2 wherein 40% of the surface is cleaned.
Figure 4:
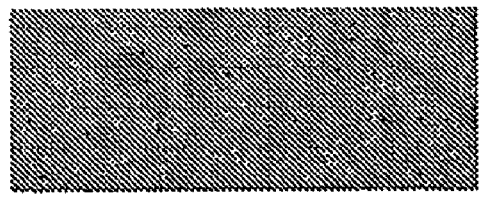
FIG. 4 illustrates Grade 3 wherein 60% of the surface is cleaned.
Figure 5:
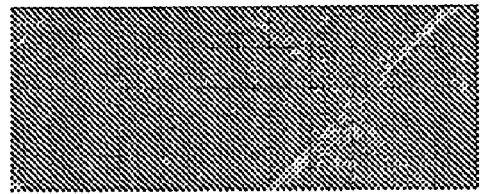
FIG. 5 illustrates Grade 4 wherein 80% of the surface is cleaned.
Figure 6:
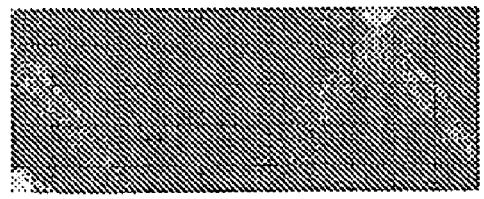
FIG. 6 illustrates Grade 5 wherein 100% of the surface is cleaned.

| Grade | Evaluation | Photograph |
|-------|-----------------------------|------------|
| 0 | The surface is not cleaned | FIG. 1 |
| 1 | 20% of the surface is cleaned | FIG. 2 |
| 2 | 40% of the surface is cleaned | FIG. 3 |
| 3 | 60% of the surface is cleaned | FIG. 4 |
| 4 | 80% of the surface is cleaned | FIG. 5 |
| 5 | 100% of the surface is cleaned | FIG. 6 |

Photographs are taken and are presented in the figures.

Results

The grade with various pretreatments and various removal compositions is given.

| Pretreatment | Removal composition A (comparative) | Removal composition B (Example 1) |
|--------------|--------------------------------------|------------------------------------|
| None | 2.5 | 4.5 |
| Protectguard ® | 2.5 | 4 |
| Novipro ® | 2.5 | 4.5 |

It is found that the product of example 1 exhibits a very significantly improved effectiveness.

What is claimed is:

1. A method for treatment of graffiti comprising applying a product to a substrate, wherein the product comprises a diester of a dicarboxylic acid of formula (I):

$R^1$—OOC-A-COO—$R^2$ (1)

wherein:
the $R^1$ and $R^2$ groups independently comprise a linear or branched, cyclic or noncyclic, $C_1$-$C_{20}$ alkyl, aryl, alkylaryl or arylalkyl group; and
the A group comprises a branched divalent $C_3$-$C_{10}$ alkylene group.

2. The method for treatment of graffiti of claim 1, wherein the A group is a $C_6$ group.

3. The method for treatment of graffiti of claim 1, wherein the A group is:
the $A_{MG}$ group of formula —CH(CH$_3$)—CH$_2$—CH$_2$—,
the $A_{ES}$ group of formula —CH(C$_2$H$_5$)—CH$_2$—, or mixtures thereof.

4. The method for treatment of graffiti of claim 1, wherein the $R^1$ and $R^2$ groups, independently comprise methyl, ethyl, n-propyl, isopropyl, benzyl, phenyl, n-butyl, isobutyl, cyclohexyl, hexyl, n-hexyl, isooctyl, or 2-ethylhexyl groups.

5. The method for treatment of graffiti of claim 1, wherein the dicarboxylic acid diester comprises CH$_3$—OOC—CH(CH$_3$)—CH$_2$—CH$_2$—COO—CH$_3$.

6. The method for treatment of graffiti of claim 1, wherein the product comprises at least 50% by weight of diester(s) with respect to the total amount of the product, and wherein the A group is a branched divalent alkylene group.

7. The method for treatment of graffiti of claim 1, wherein the product comprises diesters of dicarboxylic acids of the following formulae:

$R^1$—OOC-$A_{MG}$-COO—$R^2$ (I'), $R^1$—OOC-$A_{ES}$-COO—$R^2$ (I"), optionally $R^1$—OOC—(CH$_2$)$_4$—COO—$R^2$ (II), and mixtures thereof;
wherein:
$A_{MG}$ is a group of formula —CH(CH$_3$)—CH$_2$—CH$_2$—, and
$A_{ES}$ is a group of formula —CH(C$_2$H$_5$)—CH$_2$—.

8. The method for treatment of graffiti of claim 7, wherein the $R^1$ and $R^2$ groups are methyl groups.

9. The method for treatment of graffiti of claim 7, wherein the product comprises:
from 70 to 95% by weight of the dicarboxylic acid diester of formula (I'),
from 5 to 30% by weight of the dicarboxylic acid diester of formula (I"), and
from 0 to 10% by weight of the dicarboxylic acid diester of formula (II).

10. The method for treatment of graffiti of claim 1, wherein the product is applied to remove graffiti present, on the substrate.

11. The method for treatment of graffiti of claim 1, wherein the substrate comprises building material.

12. The method for treatment of graffiti of claim 11, wherein the building material comprises:
a ceramic,
a hydraulic binder material,
wood,
baked clay,
stone, or
mixtures thereof.

13. The method for treatment of graffiti of claim 1, further comprising pretreating the substrate with a pretreatment product before the appearance of graffiti.

* * * * *